Feb. 9, 1960 — C. W. BRANDON — 2,924,125
AUTOMATIC GEAR CLEARANCE ADJUSTING MECHANISM FOR DIFFERENTIALS
Filed April 15, 1958 — 3 Sheets-Sheet 1

INVENTOR
CLARENCE W. BRANDON
BY Kimmel & Crowell
ATTORNEYS

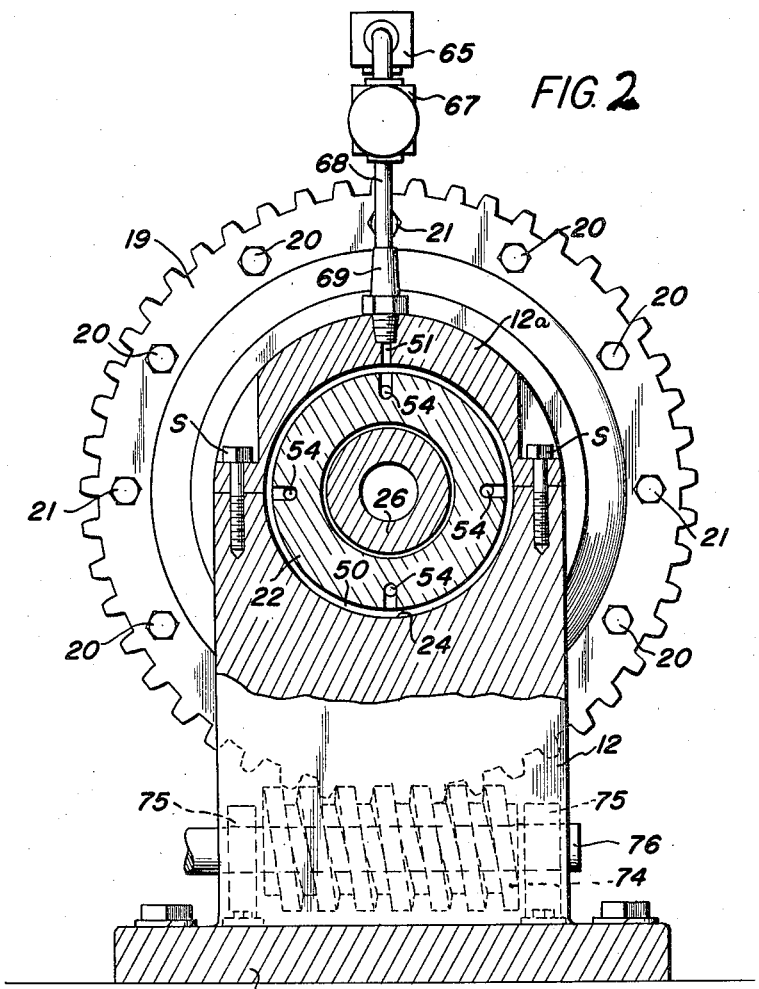
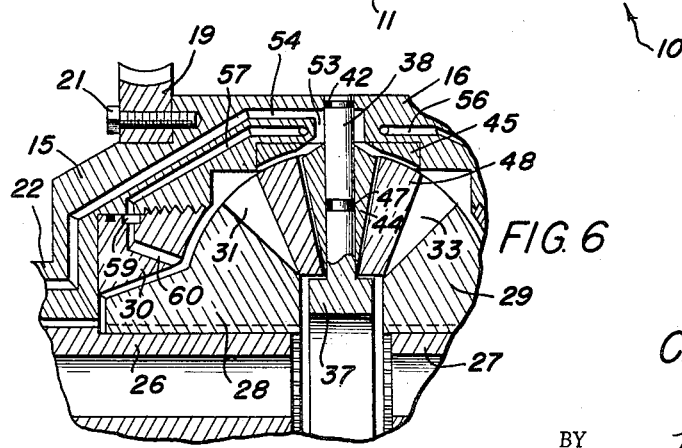

Feb. 9, 1960  C. W. BRANDON  2,924,125
AUTOMATIC GEAR CLEARANCE ADJUSTING MECHANISM FOR DIFFERENTIALS
Filed April 15, 1958  3 Sheets-Sheet 3

INVENTOR
CLARENCE W. BRANDON
BY Kimmel & Crowell
ATTORNEYS

# United States Patent Office 2,924,125
Patented Feb. 9, 1960

2,924,125

AUTOMATIC GEAR CLEARANCE ADJUSTING MECHANISM FOR DIFFERENTIALS

Clarence W. Brandon, Tulsa, Okla.

Application April 15, 1958, Serial No. 728,662

11 Claims. (Cl. 74—713)

The present invention relates to an automatic gear clearance adjusting mechanism for maintaining the desired backlash within a differential gear assembly.

In differential assemblies of the type which are exposed to regularly or irregularly occurring impacts, it has been difficult to maintain the gears in properly spaced relation to maintain the desired backlash in the differential. Even in differentials which are perfectly spaced when assembled or repaired, normal use creates wear in the teeth and in the bearings so that the clearances in the differential rapidly exceed the allowable tolerances so that excessive backlash is permitted. In the conventional differential, shims must be inserted to compensate for the worn parts and to bring the clearances therebetween within the desired tolerances. If the shims are not inserted, the excessive wear created by the backlash will soon cause chipping of the ball or roller bearings as well as excessive wear in the gears to eventually necessitate the replacement of all of the elements of the differential.

The clearance between the gears of the conventional differential is essential to proper operation of the differential since the differential will bind or lock up if the clearances are reduced below acceptable tolerances.

The primary object of the invention is to provide a differential assembly having hydraulic pressure means incorporated therein for maintaining the differential gears in correctly spaced relation controlled from a point outside of the differential.

Another object of the invention is to provide a differential gear assembly having a pressure lubricating system constructed so as to bring pressure against the gears of the differential in a direction to control the clearance between the gears.

A further object of the invention is to provide in a differential mechanism of the class described above, means for adjusting the clearance between gears and bearings such that inexpensive bronze bearings may be utilized, the pressure lubricating quality of the mechanism being such that a film of oil is maintained on all contacting surfaces of moving parts.

A still further object of the invention is to provide a clearance adjusting structure in a differential assembly which maintains a cushion of oil between the gears and the bearings to assist in absorbing the variable thrusts received from the meshing of the gears.

Another important object of the invention is to provide a combined pressure lubricating system and hydraulic clearance adjusting mechanism wherein the centrifugal turning forces of the gears are utilized to increase oil pressure between the bearings and the gears.

Still another object of the invention is to provide a device of the class described above having therein a means to adjustably maintain a proper film of oil on the bearings that radially maintain the bevel gears in alignment and to effect the results by utilization of the remote control mechanism.

In a certain machine, prior to this invention, it was found that the use of a heavy duty conventional differential gearing assembly having bronze bearings, in a portion of the machine where the differential was subjected to high speed constant loads with added periodic heavy impacts being imposed thereon, it was found that the bronze bearings failed within a matter of hours, even though the gears and bearings were maintained continuously immersed in oil; and that the gears by misalignment became extremely noisy so that the operation of the machine was necessarily halted while repars were effected. After alteration of the bearings and the structure of the differential gear assembly in accordance with the principles of the present invention, the differential gear assembly was kept in almost continual operation for one year, part of the time under loads and impacts greatly exceeding those under which the conventional differential assembly initially failed, and after this period it was found that only slight wear of the gears had developed and that proper backlash clearance was still being maintained in the assembly by maintaining an increased oil pressure within the differential. On this same machine, two other differentials were employed, each carrying about $\frac{1}{50}$ of the load and impact of the differential assembly discussed above. Yet, although the size of these two other differential assemblies was about two-thirds as large as that of the differential assembly above mentioned carrying the heavy load, it was found that during the approximate year's use of the machine both of these two smaller differential assemblies in their entirety have had to be replaced as the gears have developed excessive backlash and wear beyond that which could be compensated for by the use of shims behind the bearings thereof.

Another object of the invention is to provide a differential mechanism having hydraulic pressure means to adjust the bearings thereof and to maintain the desired clearance between the bearings and the gears.

Other objects and advantages will become apparent in the following specification when considered in the light of the attached drawings, in which:

Figure 2 is a fragmentary vertical cross-section taken along the line 2—2 of Figure 1, looking in the direction of the arrows.

Figure 6 is a view similar to Figure 1, showing the gears in an inwardly adjusted position.

Figure 1:
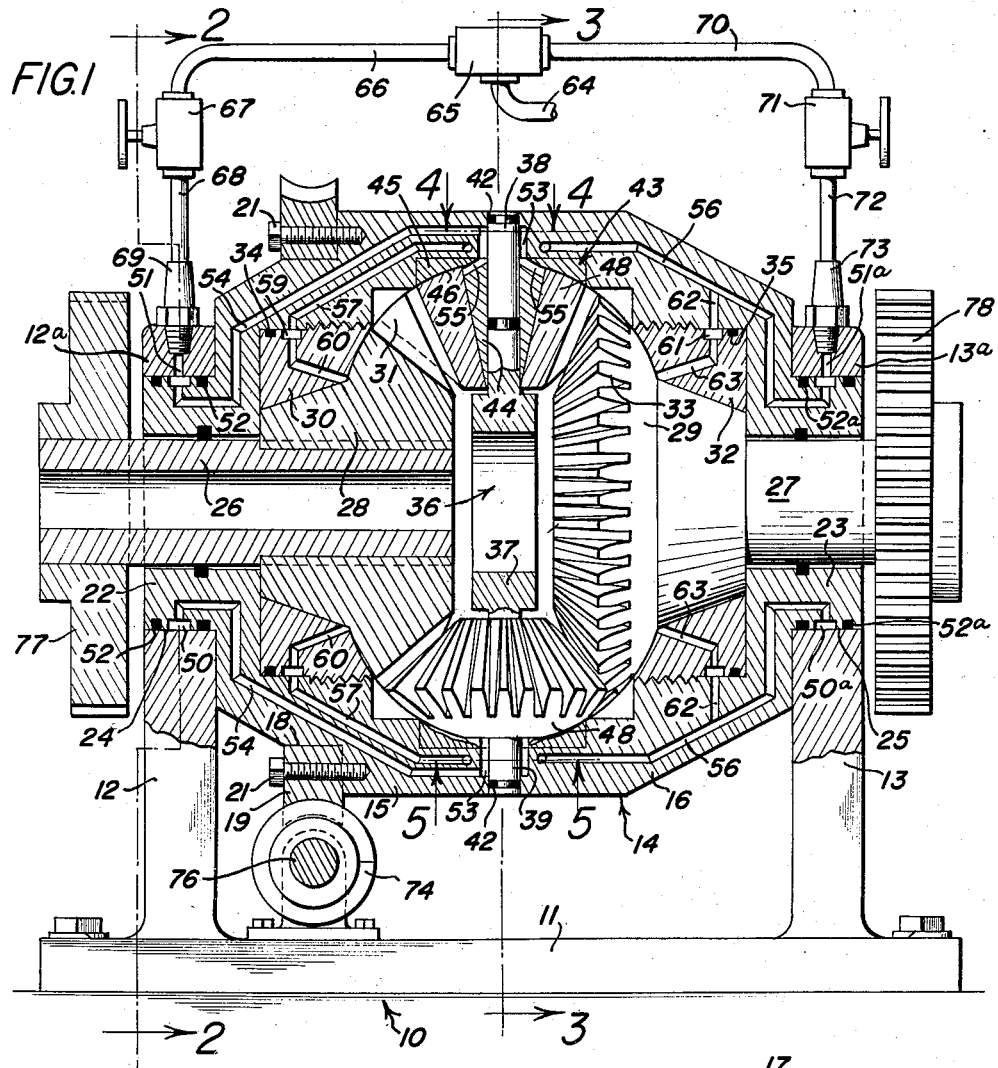
Figure 1 is a view in central longitudinal section through a differential gearing assembly incorporating the invention.

Referring now to the drawings in detail wherein like reference characters indicate like parts throughout the several figures, the reference numeral 10 indicates generally a differential mechanism constructed in accordance with the invention.

The differential assembly 10 includes a generally rectangular flat base 11 having a pair of spaced apart parallel standards 12, 13 fixedly secured thereto in upwardly extending relation. The standards 12, 13 are provided with removable cap members 12a, 13a respectively secured to the standards 12, 13 by means of cap screws S, as seen in Figure 2.

Figure 4:
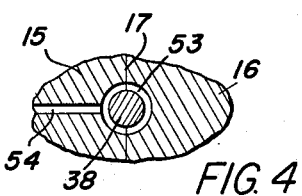
Figure 4 is an enlarged fragmentary transverse cross-section taken along the line 4—4 of Figure 1, looking in the direction of the arrows.
Figure 5:
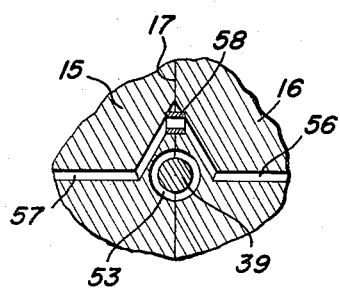
Figure 5 is an enlarged fragmentary transverse cross-section taken along the line 5—5 of Figure 1, looking in the direction of the arrows.
Figure 3:
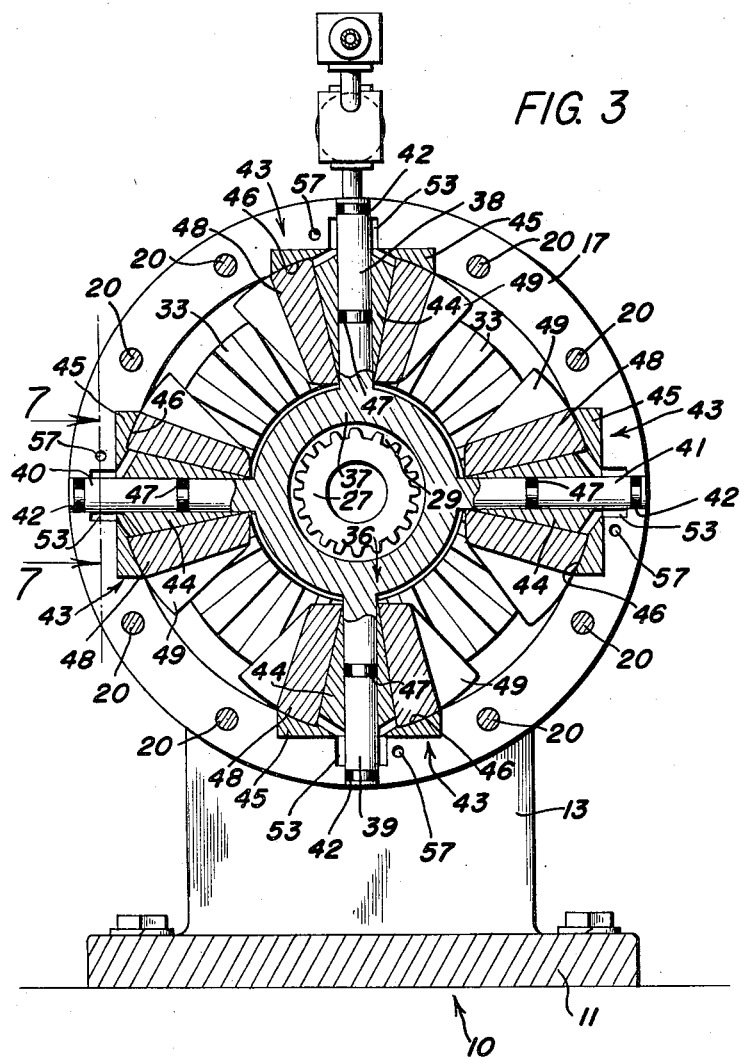
Figure 3 is a fragmentary vertical cross-section taken along the line 3—3 of Figure 1, looking in the direction of the arrows.
Figure 7:
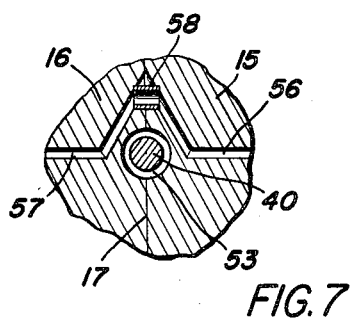
Figure 7 is an enlarged fragmentary transverse cross-section taken along the line 7—7 of Figure 3, looking in the direction of the arrows.

A differential housing, generally indicated at 14, comprises a pair of housing sections 15, 16 engaged together along a line 17, as seen in Figures 4, 5 and 7. The housing section 15 is provided with an annular recess 18 in which is seated an annular ring gear 19. A plurality of bolts 20 secure the housing sections 15, 16 together and secure the ring gear 19 in the annular recess 18. A plurality of somewhat shorter bolts 21 assist in securing the ring gear 19 to the housing section 15.

The housing section 15 is provided with a hollow hub 22, and the housing section 16 is provided with a hollow hub 23 in axially aligned relation to the hub 22. The hub 22 is journalled in a bearing 24 formed in the standard 12 and in the cap 12a. The hub 23 is journalled in a bearing 25 formed in the standard 13 and in the cap 13a. A hollow shaft 26 is journalled in the hollow hub 22, and a second hollow shaft 27 is journalled in the hollow hub 23 in axially aligned relation to the hollow shaft 26.

A bevel gear 28 is splined to the inner end of the shaft 26 for axial sliding movement thereon, and a bevel gear 29 is splined to the inner end of the shaft 27 for axial sliding movement thereon. An annular end thrust member 30 is threadably mounted within the housing section 15 in a position to engage the bevel gear 28 on the side thereof opposite the teeth 31. An end thrust member 32 is threadably mounted in the housing section 16 engaging the bevel gear 29 on the side thereof opposite the teeth 33 thereof.

An annular seal 34 is positioned between the end thrust member 30 and the housing section 15, and an annular seal 35 is positioned between the end thrust member 32 and the housing section 16.

A differential spider, generally indicated at 36, has a central ring portion 37 arranged between and axially aligned with the hollow shafts 26, 27 and is provided with a pair of aligned upper and lower shafts 38, 39 and a second pair of axially aligned side shafts 40, 41. The shafts 38, 39, 40, 41 extend radially outwardly from the ring 37 and are integrally formed therewith. The shafts 38, 39, 40, 41 are each provided with a sealing O ring 42 at the outer end thereof and are clamped between the housing sections 15, 16 with the sealing O rings 42 in engagement therewith.

A bearing member, generally indicated at 43, is mounted on each of the shafts 38, 39, 40, 41, and is provided with an elongated inwardly converging conical portion 44 integrally extending inwardly from an annular radially outwardly extending thrust portion 45. The annular thrust portion 45 and the conical portion 44 are arranged in axial alignment, and the thrust portion 45 as a generally radially extending semi-spherical seat 46 on the inner face thereof.

The shafts 38, 39, 40 and 41, intermediate the ring 37 and the O rings 42, are each provided with a sealing O ring 47 to seal the conical portions 44 of the bearing members 43 to the shafts 38, 39, 40 and 41, respectively.

A bevel spider gear 48 is journalled on each of the conical portions 44 of the bearing members 43 with the teeth 49 thereof meshing respectively with the teeth 31, 33 of the bevel gears 28, 29, as can be best seen in Figure 1.

The hub 22 is provided with an annular groove 50 which is arranged in communication with a port 51 extending through the bearing 24 in the standard 12. Annular seals 52 are arranged parallel to and on opposite sides of the groove 50 in engagement with the bearing 24 to prevent leakage therefrom.

The housing sections 15, 16 at their juncture 17 are provided with enlarged bores 53 surrounding each of the shafts 38, 39, 40 and 41, inwardly of the sealing O rings 42 and communicating with the inside of the housing 14.

A passage 54 extends from each of the bores 53 through the housing section 15 and communicates with the groove 50. A plurality of ports 55 extend in outwardly diverging relation through the bearing members 43 communicating at one end with the inner end of the bores 53 and the other end with the juncture of the conical portion 44 and the thrust portion 45 of the bearing member 43.

The hub 23 is provided with an annular groove 50a, and a port 51a formed in the standard 13 extending through the bearing 25 communicates therewith. Annular seals 52a are arranged in spaced apart parallel relation on opposite sides of the annular groove 50a in contact with the bearing 25 to seal the annular groove 50a with respect thereto.

A plurality of passages 56 each have one end communicating with the annular groove 50a and extend through the housing section 16 terminating at the juncture 17 thereof with the housing section 15 closely adjacent each of the shafts 38, 39, 40 and 41. A plurality of passages 57 extend through the housing section 15 and a tubular sealing member 58 communicates the ends of the respective passages 56, 57 at the juncture 17, as best shown in Figures 5 and 7.

The end thrust member 30 is provided with an annular groove 59 with each of the passages 57 communicating therewith. A plurality of ports 60 extend through the end thrust member 30 communicating at one end with the annular groove 59 and with a rear face of the bevel gear 28 at the opposite end.

An annular groove 61 is formed in the end thrust member 32 communicating with a plurality of passages 62 extending from the passages 56. A plurality of ports 63 have one end communicating with the annular groove 61 and extend through the end thrust member 32 with their opposite ends extending to a rear face of the bevel gear 29.

A conduit 64 extends from a pressure pump of a pressure lubricating system (not shown) terminating in a two-way fitting 65. A conduit 66 extends from one side of the fitting 65 to a hand control valve 67. The hand control valve 67 is connected to the port 51 of the standard 12 by means of a conduit 68 and fitting 69. A conduit 70 extends from the opposite side of the fitting 65 to a second hand control valve 71. The hand control valve 71 is connected to the port 55 by means of a conduit 72 and a fitting 73.

A worm gear 74 is journalled to the base 11 on bearings 75 which support the shaft 76 of the worm gear 74. The worm gear 74 is meshed with the ring gear 19 so that rotation of the shaft 76 will rotate the ring gear 19 and the housing 14. It should be noted that the worm gear 74 may be mounted in any position about the periphery of the ring gear 19 with the shaft 76 extending in any desired direction. The shaft 76 extends to a control device (not shown) by means of which the worm gear 74 may be rotated to rotate the ring gear 19.

The hollow shaft 26 is provided with a power input spur gear 77 mounted to the opposite end thereof opposite the bevel gear 28. The hollow shaft 27 is provided with a power output spur gear 78 mounted thereon at the end thereof opposite the bevel gear 29.

In the differential assembly 10 illustrated herein the gear 77 is rotated by a power device causing the shaft 26 and bevel gear 28 to rotate therewith. The spider gears 48 meshed with the bevel gear 28 rotate on their axes while the spider 36 remains stationary with the housing 14. The bevel gear 29 is meshed with the spider gears 48 and is driven thereby to rotate the shaft 27 and the output gear 78. Obviously, the shaft 27 is rotating oppositely with respect to the shaft 26.

The present differential assembly 10 is particularly useful in changing the angular relationship between the input gear 77 and the output gear 78 to vary the timed relationship of the operation of a device (not shown) driven by the output gear 78 with respect to the power device (not shown) driving the input gear 77.

To vary the angular relationship between the input gear 77 and the output gear 78, the worm gear 74 is rotated in turn rotating the ring gear 19 and the housing 14. Rotation of the housing 14 will rotate the spider 36 causing the spider gears 48 to be moved to a new position and consequently changing the angular relationship between the shaft 26 and the shaft 27.

In the operation of the lubricating and clearance control hydraulic system, lubricating oil from the conduit 64 flows through the hand control valve 67, through the passage 54, bore 53, through ports 55 into engagement with the outer end of the spider gear 48. Lubricating oil under pressure then flows between the spherical surface 46 of the bearing member 43 and the outer end of the spider gear 48 forcing the spider gear 48 inwardly with respect to the spider 36.

A portion of the lubricating oil flowing through the port 55 passes between the spider gear 48 and the conical portion 44 of the bearing 43 to provide a cushion as well as lubricate the adjacent surfaces. The lubricating oil flowing outwardly between the spider gear 48 and the spherical seat 46 then flows between the teeth 31 and the teeth 49 of the bevel gear 28 and spider gear 48 respectively to lubricate these surfaces.

Lubricating oil flowing from the conduit 64 passes through the hand control valve 71, through the passages 56, 57 to the annular grooves 61, 59, respectively. The lubricating oil flows from the annular grooves 59 and 61, through the ports 60, 63 to engage respectively the outer surfaces of the bevel gears 28, 29. Hydraulic pressure of the lubricating oil forces the bevel gears 28, 29 inwardly toward the spider 36 to increase the meshing contact between the spider teeth 49 and the bevel gear teeth 31, 33, respectively.

In Figure 1 of the drawings, the spiders 48 and bevel gears 28, 29 are illustrated in their outermost position with the hydraulic pressure at a relatively low point. In Figure 6, the spider gears 48 and the bevel gears 28, 29 are being subjected to substantial hydraulic pressures and are illustrated in their innermost position.

It should be noted that the rotational movement of the spiders 48 and the bevel gears 28, 29 create centrifugal forces on the lubricating fluids and these forces are utilized in the operation of the device to automatically increase the effective pressure of the lubricating fluid as the rotational speed of the gears 28, 29 and 48 are increased along with the forces acting on the differential mechanism 10.

Obviously, the hand control valves 67, 71 are utilized to control the hydraulic pressures acting against the gears 28, 29 and the spider gears 48 so as to accurately control the clearances therebetween, and thus control the backlash within the differential mechanism 10. By controlling the backlash, the present invention virtually eliminates wear within the differential mechanism 10 so that extremely long differential life is experienced under exceedingly rough conditions of service.

While the principles of the present invention have been illustrated as applied to a specific differential mechanism, it should be understood that these principles may be employed to advantage in other differential mechanisms as well as bevel gear assemblies in general.

Having thus described the preferred embodiment of the invention, it should be understood that numerous structural modifications and adaptations may be resorted to without departing from the scope of the appended claims.

What is claimed is:

1. An adjustable gear assembly comprising a pair of shafts having their axes extending at an angle to each other, a bevel gear carried by each of said shafts for longitudinal sliding movement thereon, said bevel gears being in mesh with the clearance therebetween varying with the longitudinal position of said gears on their respective shafts, and hydraulic means for moving said gears on their respective shafts toward each other to control the clearance therebetween.

2. A device as claimed in claim 1 wherein said hydraulic means includes lubricating oil under pressure directly engaging said gears to move and simultaneously lubricate said gears.

3. A device as claimed in claim 1 wherein at least one of said gears is supported on a conical bearing for rotational and sliding movement thereon.

4. A device as claimed in claim 1 wherein said gears are supported for movement within a housing.

5. A bevel gear assembly including a pair of meshing bevel gears, a bearing supporting one of said bevel gears for sliding movement towards the other whereby to adjust the clearance therebetween, means for applying lubricant to said gears, said lubricant means including means for conducting lubricant under pressure to said movable gear and effecting movement of the latter towards the other bevel gear, means for controlling the pressure of the lubricant supplied by said conducting means and thereby vary the clearance between said gears, and means for directing lubricant under pressure between said bevel gears.

6. A bevel gear assembly including a pair of shafts, a pair of meshing bevel gears, a bearing mounted upon one of said shafts and carrying one of said bevel gears for rotational and sliding movement thereon towards and from the other bevel gear, means extending between and mounting the other of said bevel gears to the other of said shafts for preventing relative rotation therebetween, means for supplying lubricant under pressure against said bevel gear on said bearing and moving it towards said other bevel gear whereby to vary the clearance therebetween, means for controlling the pressure of said lubricant during the operation of said assembly and thereby regulating the backlash in said gears.

7. The combination of claim 6 wherein said bearing and the bevel gear carried thereby have complementary conical surfaces.

8. A bevel gear assembly including a casing, a pair of relatively inclined shafts in said casing, a pair of meshing bevel gears on said shafts, a bearing supporting one of said bevel gears on one of said shafts for sliding movements towards the other bevel gear whereby to adjust the clearance therebetween, said casing having a recess therein, said bearing having a thrust member supported in said recess, means for supplying a lubricant under pressure between said thrust member and said one of said bevel gears for adjusting the clearance between said bevel gears.

9. The combination of claim 8 including passages through said bearing conducting lubricant from said recess to the surface between the bearing member and the bevel gear mounted thereon.

10. A bevel gear assembly including; a first bevel gear, a second bevel gear meshing with said first bevel gear, a bearing supporting said first bevel gear for rotational movement and sliding movement toward said second bevel gear to adjust the clearance between said first and second bevel gears, means for applying a lubricant under pressure to said first bevel gear to force said first bevel gear into closer meshing engagement with said second bevel gear, said first and second bevel gears upon rotation thereof moving said lubricant and centrifugally increasing the pressure thereon whereby the pressure on said lubricant will be increased along with increases in the speed of rotation of said gears.

11. A bevel gear assembly including; a first bevel gear, a second bevel gear meshing with said first bevel gear, a bearing supporting said first bevel gear for rotational movement and sliding movement toward said second bevel gear to adjust the clearance between said first and second bevel gears, means for applying a lubricant under pressuer axially to said first bevel gear oppositely of said second bevel gear to force said first bevel gear into closer meshing engagement with said second bevel gear, said first and second bevel gears upon rotation thereof moving said lubricant and centrifugally increasing the pressure thereon whereby the pressure on said lubricant will be increased along with increases in the speed of rotation of said gears.

References Cited in the file of this patent

UNITED STATES PATENTS

| | | |
|---|---|---|
| 2,203,292 | Best | June 4, 1940 |
| 2,302,575 | Romaine et al. | Nov. 17, 1942 |
| 2,386,367 | Taylor | Oct. 9, 1945 |
| 2,448,426 | Galloway | Aug. 31, 1948 |